United States Patent
Kim et al.

(10) Patent No.: US 10,019,211 B2
(45) Date of Patent: Jul. 10, 2018

(54) IMAGE READING APPARATUS AND IMAGE READING METHOD

(71) Applicant: S-Printing Solution Co., Ltd., Suwon-si, Gyeonggi-do (KR)

(72) Inventors: Hong-seock Kim, Suwon-si (KR); Hye-soo Kim, Suwon-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days.

(21) Appl. No.: 15/314,039

(22) PCT Filed: May 18, 2015

(86) PCT No.: PCT/KR2015/004979
§ 371 (c)(1),
(2) Date: Nov. 25, 2016

(87) PCT Pub. No.: WO2015/186916
PCT Pub. Date: Dec. 10, 2015

(65) Prior Publication Data
US 2017/0199711 A1 Jul. 13, 2017

(30) Foreign Application Priority Data

Jun. 5, 2014 (KR) .................. 10-2014-0068591
Jun. 18, 2014 (KR) .................. 10-2014-0074189
Oct. 6, 2014 (KR) .................. 10-2014-0134077

(51) Int. Cl.
*G06F 3/12* (2006.01)
*H04N 1/00* (2006.01)

(52) U.S. Cl.
CPC .......... *G06F 3/1271* (2013.01); *G06F 3/1203* (2013.01); *G06F 3/1236* (2013.01); *G06F 3/1285* (2013.01); *H04N 1/00244* (2013.01); *H04N 1/00307* (2013.01); *H04N 1/00411* (2013.01)

(58) Field of Classification Search
USPC ....................................................... 358/1.15
See application file for complete search history.

(56) References Cited

U.S. PATENT DOCUMENTS

| | | |
|---|---|---|
| 7,419,100 B2 | 9/2008 | Groeneboer et al. |
| 7,457,951 B1 | 11/2008 | Proudler et al. |
| 7,688,475 B2 * | 3/2010 | Yoo .................. G03G 15/607 358/403 |

(Continued)

FOREIGN PATENT DOCUMENTS

| | | |
|---|---|---|
| JP | 2007-108947 A | 4/2007 |
| JP | 4367929 B2 | 11/2009 |

(Continued)

*Primary Examiner* — Ngon Nguyen
(74) *Attorney, Agent, or Firm* — Jefferson IP Law, LLP

(57) ABSTRACT

An image scanning apparatus is disclosed. The image scanning apparatus comprises: a scanner for generating a scan image by scanning a loaded document; and a controller for in response to sensing the presence of a preset identification mark in the generated scan image, processing, with a first job, the scan image before the document in which an identification mark is present and processing, with a second job, the scan image for the document in which an identification mark is present and the scan image after the document.

20 Claims, 23 Drawing Sheets

(56) References Cited

U.S. PATENT DOCUMENTS

Figure 1:
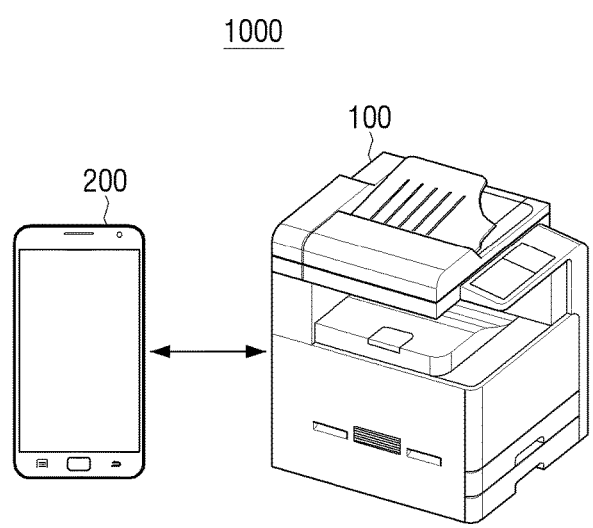

| | | |
|---|---|---|
| 7,688,745 B1 | 3/2010 | Hurtta et al. |
| 7,787,140 B2 | 8/2010 | Kim |
| 8,009,311 B2 | 8/2011 | Takahashi |
| 8,179,546 B2 | 5/2012 | Aichi et al. |
| 8,418,913 B2 | 4/2013 | Tse et al. |
| 8,804,167 B2 * | 8/2014 | Kim ................... H04N 1/203 358/1.15 |
| 9,286,019 B2 | 3/2016 | Sato |
| 2009/0045249 A1 * | 2/2009 | Miyasake .......... H04N 1/00352 235/375 |
| 2009/0051981 A1 * | 2/2009 | Kuboki ............. H04N 1/00384 358/474 |
| 2010/0231982 A1 * | 9/2010 | Mihira ............... H04N 1/00222 358/402 |
| 2011/0058228 A1 * | 3/2011 | Inamoto ............... G06K 9/2063 358/448 |
| 2011/0075199 A1 * | 3/2011 | Jung ................... H04N 1/00474 358/1.15 |
| 2011/0188098 A1 * | 8/2011 | Sahara ..................... H04N 1/04 358/498 |
| 2013/0100501 A1 | 4/2013 | Chen et al. |

FOREIGN PATENT DOCUMENTS

| | | |
|---|---|---|
| JP | 4826828 B2 | 11/2011 |
| JP | 2013-090338 A | 5/2013 |
| JP | 2013-214806 A | 10/2013 |
| KR | 10-2004-0104821 A | 12/2004 |
| KR | 10-2005-0030017 A | 3/2005 |
| KR | 10-0675379 B1 | 1/2007 |
| KR | 10-2010-0044609 A | 4/2010 |
| KR | 10-2011-0034523 A | 4/2011 |
| KR | 10-2012-0038859 A | 4/2012 |
| KR | 10-2012-0094762 A | 8/2012 |
| KR | 10-2013-0110255 A | 10/2013 |

* cited by examiner

IMAGE READING APPARATUS AND IMAGE READING METHOD

TECHNICAL FIELD

The present disclosure relates to an image scanning apparatus and a method for reading an image, and more particularly, to an image scanning apparatus and an image reading method which can receive a new scanning job, while an image scanning apparatus performs a scanning job, and conduct a plurality of scanning jobs serially.

BACKGROUND ART

An image scanning apparatus is a device which scans an original image on a document, a drawing, or a film and converts them to digital data. In this case, digital data can be displayed on a computer monitor or printed on a printer, and generated as an output image. As an example of the image scanning apparatus, there is a multi function peripheral (MFP) which embodies a scanner, a copy machine, a facsimile, or a function thereof in one device.

An image scanning apparatus having scanning function such as a scanner, a facsimile, and a digital copy machine, in order to scan continued documents, has an auto document feeder (ADF). In addition, in order to scan both sides of a fed document, a dual auto document feeder (DADF) having a plurality of scanning units to automatically scan both sides of the fed document can be provided.

However, in case of the related-art image scanning apparatus, another scanning job cannot be input by a user, when one scanning job is being performed.

To be specific, the related art image scanning apparatus has no method to separate documents filed in a loading portion, and when a user loads new scanning documents along with existing documents, the related art image scanning apparatus processed the existing document and a new document as one job.

Therefore, when a scanning option which is set for a new scanning job is different from the past one, or it can be stored in another storage, a user needs to input a new scanning command after waiting on-going a scanning job is completed.

In addition, in case of a multi-function peripheral (MFP) which provides functions of copy, scan, and fax transmission, it is frequent that a plurality of users use one MFP.

In this case, there is a difficulty for many users to use one or a few devices at the same time. For example, when conducting a large amount of printing jobs, there are problems of inefficiency that scanning jobs cannot be done at the same time, a scanning job should be in a stand-by state on MFP, or a user needs to wait to receive copied our output printouts.

Regarding the above, in the case of the related art, when MFP is under use, a method for notifying a user is not provided. In addition, due to lack of internal memory or resource, simultaneous job is not possible, job can be performed with methods to suspend a job for a certain period of time or stop job until a resource required for the job can be secured.

As such, in the related art, a focus is on efficient promotion of on-going job than using one device by a plurality of users at the same time. In case of using a mobile device, the mobile device is used as an independent working means, and it is not used as a method for supplementing lacking resources.

When jobs such as copy, scan, and fax transmission are on-going on an MFP, a user wishing to perform the same function using the device needs to check the MFP state, and check if a job is done, and then perform own job, feeling inconvenient.

DESCRIPTION OF THE INVENTION

Tasks to be Solved

Therefore, the purpose of the invention is to provide an image scanning apparatus which may receive a new scanning job while an image scanning apparatus is conducting a scanning job, and serially perform a plurality of scanning jobs accordingly, and a method for reading an image.

Another purpose of the invention is to provide a mobile device which can improve user convenience by using a reservation job for offline jobs between a mobile device and an image scanning apparatus such as MFP to form a document, image scanning apparatus, a method for job reservation method for image forming on offline, a method for performing reservation job to form an image offline, and a computer readable recording medium.

In addition, another purpose of the present invention is to provide a mobile device which efficiently supports a job of many users using idle resource of a mobile device or printing devices, and having enhanced usability such as division of serial jobs, sharing of resources, and reservation notice function, an image scanning apparatus, a method for reservation of a job to form an image offline, and a computer readable recording medium.

Another purpose of the invention is to provide a mobile device which can improve user convenience by using a reservation job for offline jobs between a mobile device and an image scanning apparatus such as MFP to form a document, image scanning apparatus, a method for job reservation method for image forming on offline, a method for performing reservation job to form an image offline, and a computer readable recording medium.

In addition, still another purpose of the present invention is to provide a mobile device which efficiently supports a job of many users using idle resource of a mobile device or printing devices, and having enhanced usability such as division of serial jobs, sharing of resources, and reservation notice function, an image scanning apparatus, a method for reservation of a job to form an image offline, a method for performing a reservation to form an image offline, and computer readable recording medium.

Means for Solving Problems

According to an exemplary embodiment, an image scanning apparatus is disclosed. The image scanning includes a scanner for generating a scan image by scanning a loaded document; and a controller for, in response to sensing the presence of a preset identification mark in the generated scan image, processing, with a first job, the scan image before the document in which an identification mark is present and processing, with a second job, the scan image for the document in which an identification mark is present and the scan image after the document.

The controller may sense whether a preset identification mark is present in a preset area of the scan image.

The apparatus may further include an inputter for receiving a separate second job command during the first job.

The controller may sense, after the second job command is input, whether the preset identification mark is present on the generated scan image.

The inputter may receive at least one of a scan option, storage information, and identification mark information which correspond to the second job command.

The inputter may include a communication interface which receives the second job command through a mobile device connectible with the image scanning apparatus.

The communication interface, when the second job is completed, may notify a mobile device, to which the second job command is transmitted, of job completion.

The apparatus may further include an image forming unit for printing a printout which includes an identification mark corresponding to the second job.

The controller, when the document where the identification mark is present includes identification mark information only, may process a scan image after the document including the identification mark excluding a scan image corresponding to the document including the identification mark information only with the second job.

The controller, when a document where the identification mark is present, may include contents other than the identification mark information, perform image processing such that the identification mark is deleted from a scan image corresponding to the document where the identification mark is present, and process the scan image subject to the image processing and a scan image after a document where the identification mark is present with a second job.

The identification mark is one of a preset pin number, barcode, QR code, and a preset shape.

Each of the first job and the second job may be one of a scan job, copy job, and fax transmission job.

According to an exemplary embodiment, an image reading method of an image scanning apparatus is disclosed.

The method includes generating a scan image by scanning a loaded document; sensing whether a preset identification mark is present in the generated scan image; and processing, with a first job, a scan image before a document where the identification mark is present, and processing, with a second job, a scan image for a document where the identification mark is present and a scan image after the document.

The sensing may include sensing whether a preset identification mark is present in a preset area of the scan image.

The method may further include receiving a separate second scan job during the first job.

In the meantime, a mobile device according to an exemplary embodiment includes an interface unit to which a user command is input to reserve an offline job in an image scanning apparatus which forms an image of a document by offline job, an offline job reservation request unit to perform operations to reserve the offline job, and a controller, when the user command is input, which runs the offline job reservation request unit and controls the interface unit to reserve the offline job and proceed with the state regarding the reservation.

In this case, the interface unit may include a display unit to receive the user command as a touch screen method.

In the meantime, the offline job reservation request unit may store an application to proceed with the reservation and run the stored application.

The offline job regarding the document may include at least one of copy, scan, and fax transmission.

The offline job reservation request unit, in order to handle the state regarding the reservation, may proceed with at least one of monitoring status information regarding an operation status of the image scanning apparatus, reservation information which reserves the offline job, reservation status information regarding the reservation status, and notification information notifying nearing reservation job.

In this case, the reservation status information is transmitted from the image scanning apparatus to the mobile device, and may include standby status.

In the meantime, the reservation information may include option information which sets an option regarding the reservation.

According to an exemplary embodiment, the image scanning apparatus includes a communication interface which receives from a mobile device a request for reserving offline job regarding the document, in order to form an image of a document, an offline job reservation unit which monitors a job status according to the request and proceeds with reservation status information regarding a reservation performed by the mobile device based on the monitored job status, and when the request is received, a controller to control the offline job reservation unit to perform a reserved operation regarding the offline job.

In this case, the image scanning apparatus displays a UI relating to the offline job, further includes a user interface to input a user command through the UI screen, and the controller may assign a priority to a user who reserves the offline job and set lock of the UI screen to temporarily block offline job of a user according to the assigned priority.

In the meantime, the controller, when it is determined that offline job is not performed within a preset time from a user assigned with the priority right, may determine whether or not to unlock the lock according to a state of a next user to perform the offline job.

In this case, the controller, when there is no reservation regarding the offline job, may automatically release the lock.

In the meantime, the offline job reservation unit may include a state monitoring unit which monitors the job state, a reservation and notification unit which notifies the reservation priority of the reservation and notifies that the reserved offline nears, and a job reservation management unit which manages user reservation job list and manages options of the reservation.

In the meantime, the reservation and notification unit may notify the reservation order as a standby number.

According to a method for reserving an image offline according to an exemplary embodiment includes receiving a user command to reserve offline job in the image scanning apparatus to form an image of a document by an offline job, when the user command is received, receiving, from the image scanning apparatus, monitoring status information regarding the job status of the image scanning apparatus and displaying the received monitoring status information on a screen, performing offline job reservation based on monitoring status information, displaying the received reservation status information on a screen, and receiving a notice notifying that the reserved job is available.

In this case, the user command may be received as a touch screen method through the display.

In the meantime, the offline job regarding the document may include at least one of copy, scan, and fax transmission.

The reservation status information may be transmitted to the mobile device from the image scanning apparatus, and may include standby status.

In the meantime, performing the offline job may additionally set at least one option including a type of the reservation document, a document storage method and resolution.

According to an exemplary embodiment, a method for performing a reservation to form an image offline includes receiving from a mobile device a request for reserve offline job regarding the document, monitoring a job state according to the received request, transmitting the monitoring state information to the mobile device, receiving reserved information reserved in the mobile device based on the transmitted state information, transmitting the reservation state information to the mobile device, and notifying that the reserved job is available to the mobile device.

In this case, the method for performing a reservation job to form an image offline further includes displaying a UI screen relating to the offline job, and receiving a user command through the UI screen, assigning a priority to a user who reserves the offline job and setting lock of the UI screen to temporarily block offline job of another user.

In this case, when there is no reservation regarding the offline job, the lock can be automatically unlocked.

In the meantime, a method for performing a reservation to form an image offline may further include, based on received reservation information, managing a user reservation job list and managing an option regarding the reservation.

The reservation state information may be transmitted in a type of a standby number.

In the meantime, a computer readable recording medium according to an exemplary embodiment which includes a program executing a reservation job executing method offline includes performing a reservation job to form an image offline, receiving a request from a mobile device to reserve offline job regarding the document to form an image of a document by the offline job, monitoring a job state according to the received request, generating state information to be transmitted to the mobile device, receiving reserved reservation information from the mobile device based on the transmitted state information, generating reservation state information regarding the reservation, and notifying to the mobile device that the reserved job is possible.

In this case, the computer readable recording medium may further include, based on the received reservation information, managing a user reservation list and managing an option regarding the reservation.

BRIEF DESCRIPTIONS OF DRAWINGS

Figure 2:
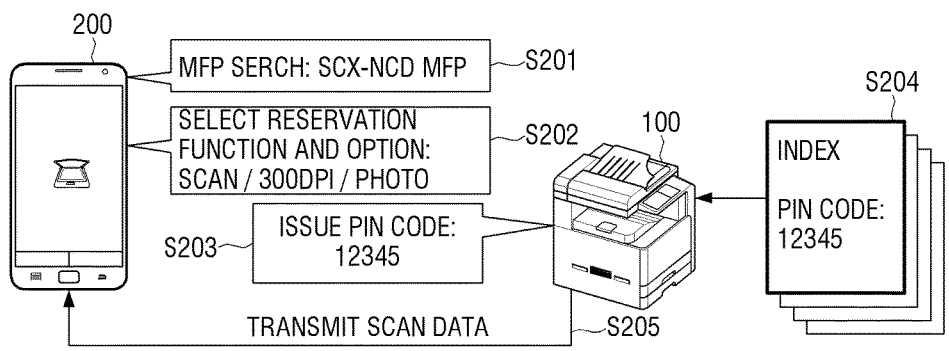
Figure 3:
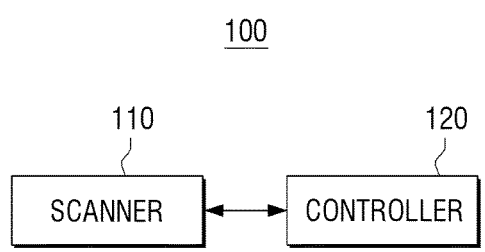
Figure 4:
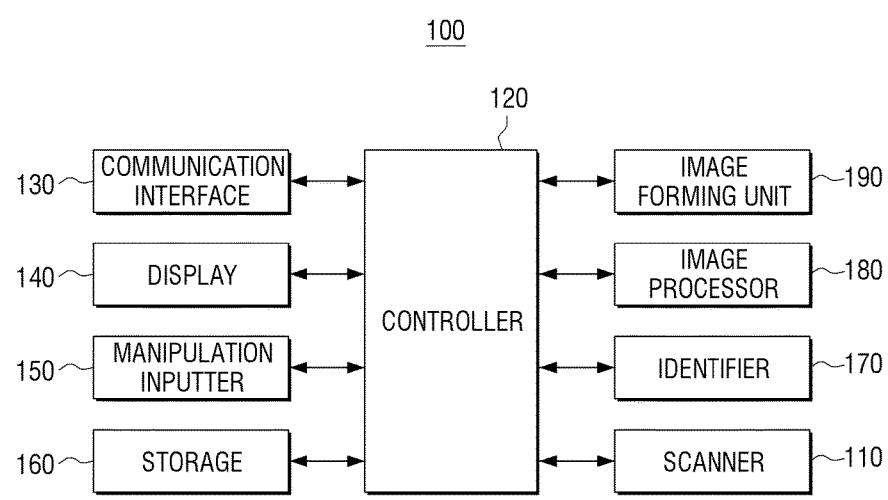
Figure 5:
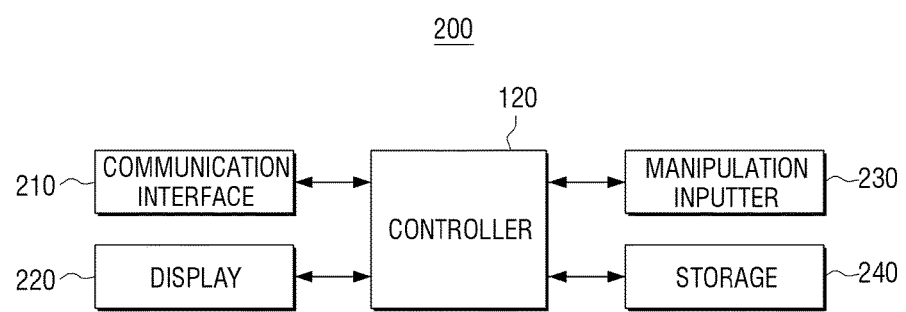
Figure 8:
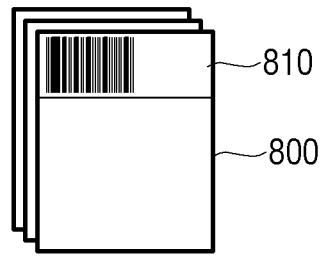
Figure 9:
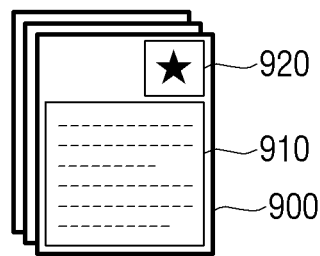
Figure 10:
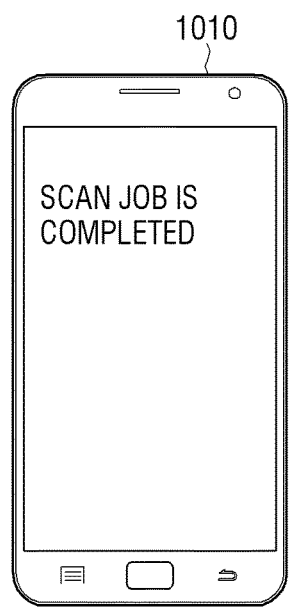
Figure 11:
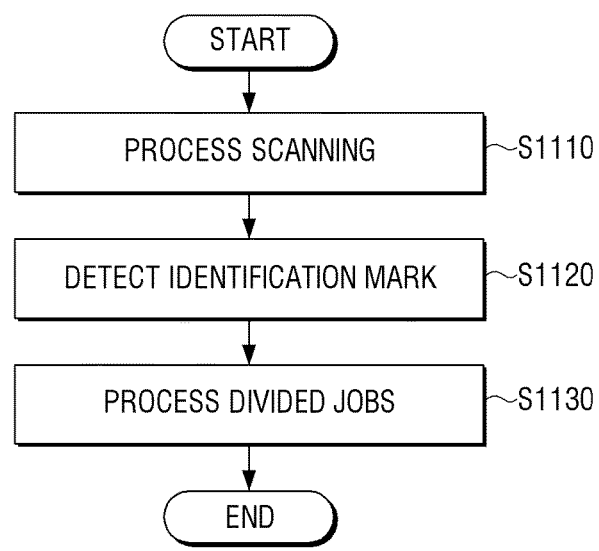
Figure 12:
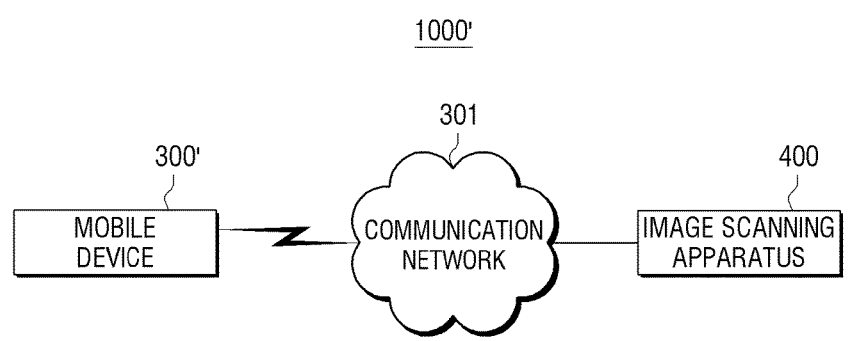
Figure 13:
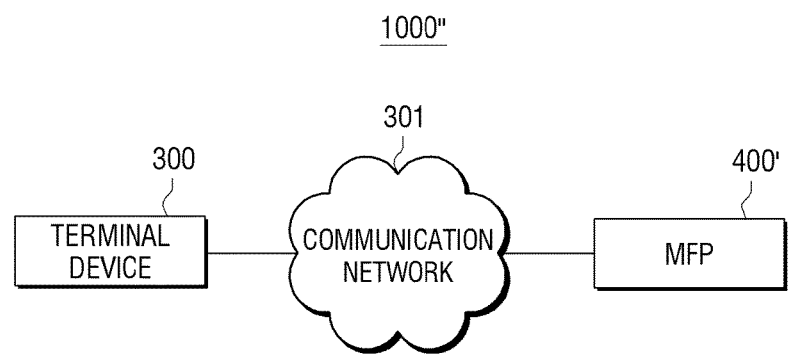
Figure 14:
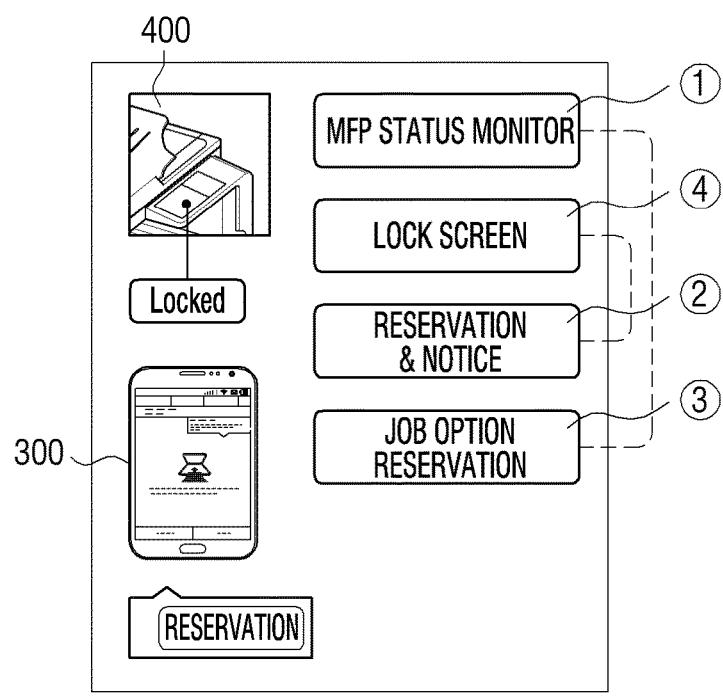
Figure 16:
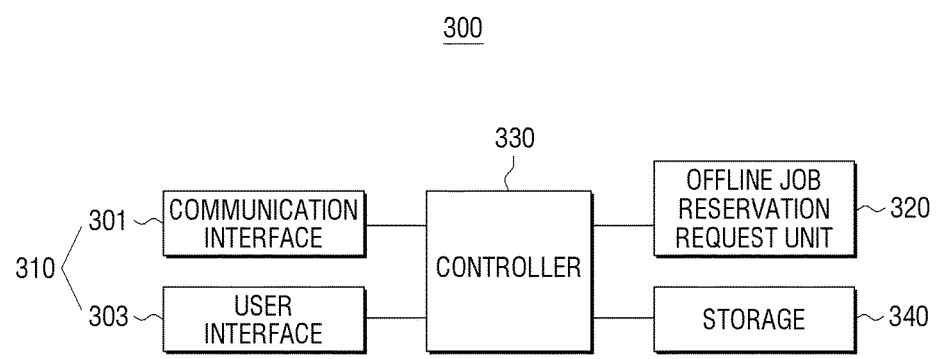
Figure 17:
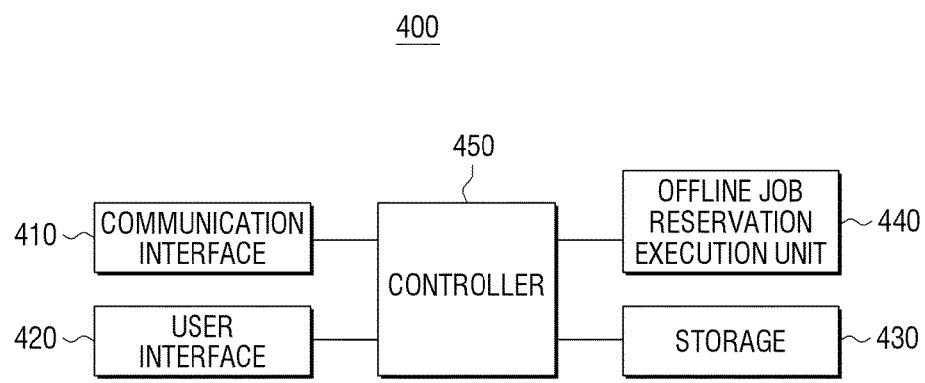
Figure 18:
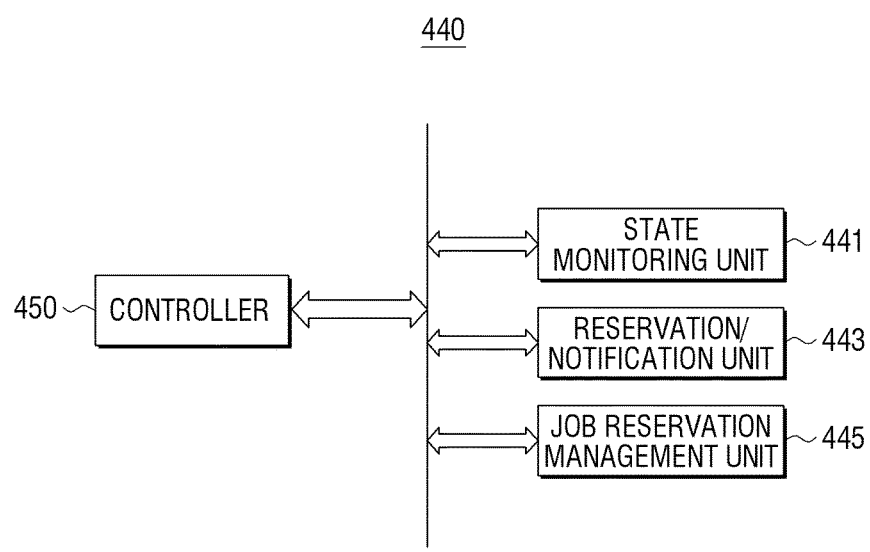
Figure 19:
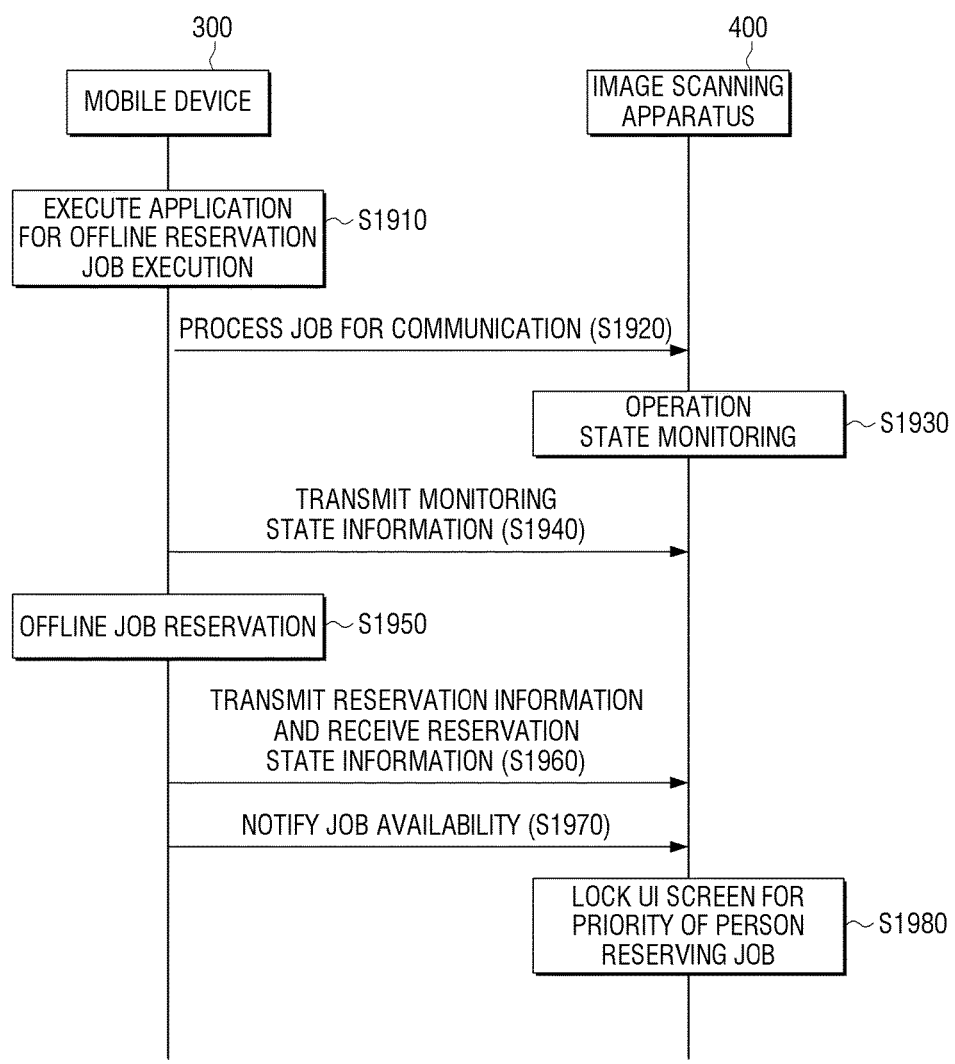
Figure 20:
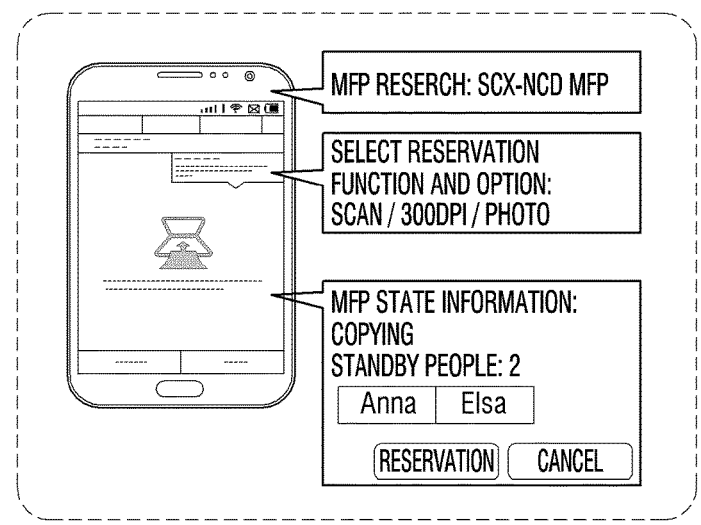
Figure 20:
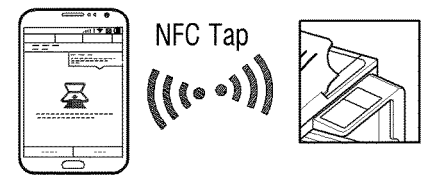
Figure 21:
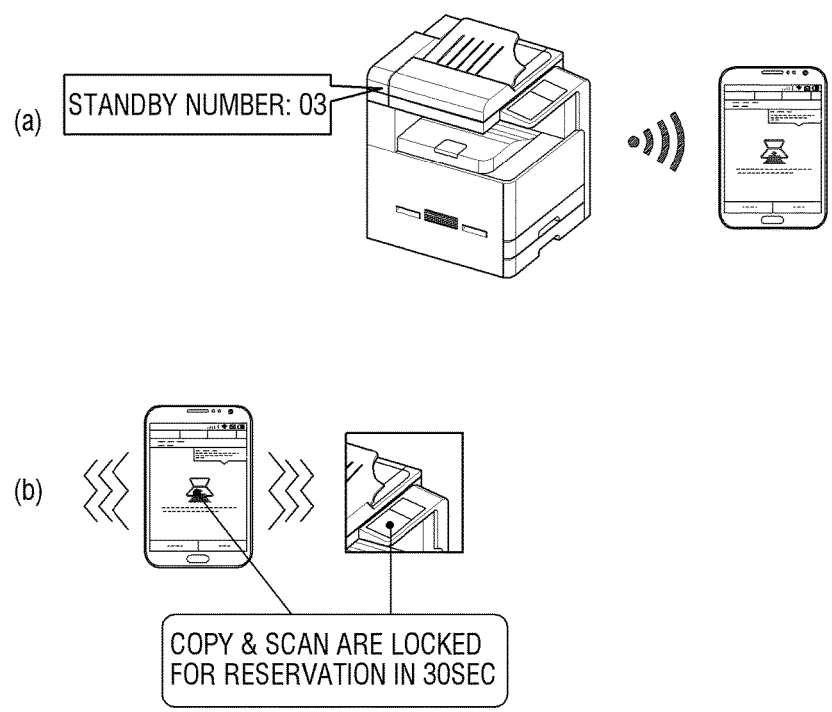
Figure 22:
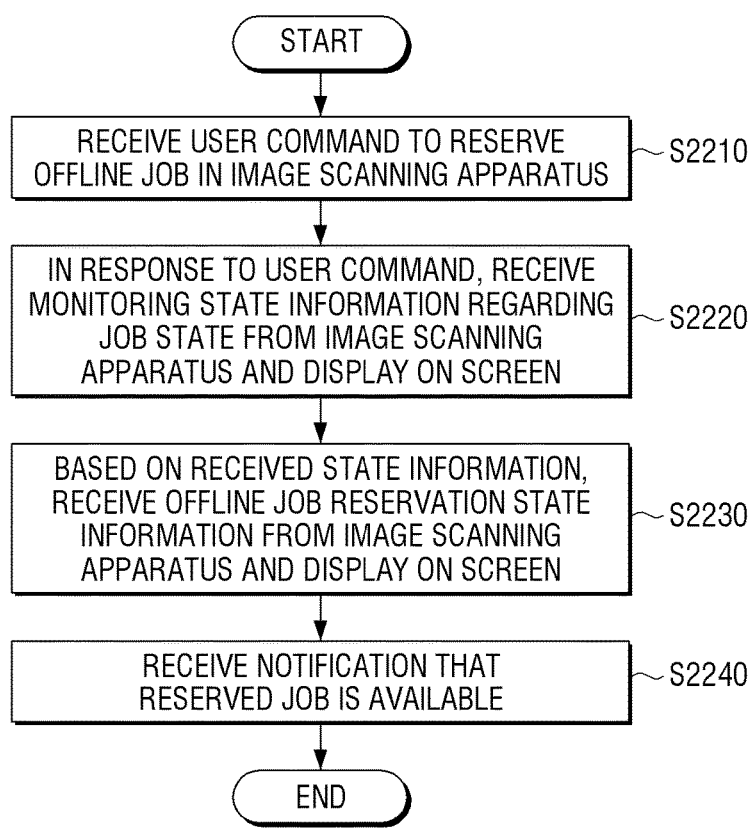
Figure 23:
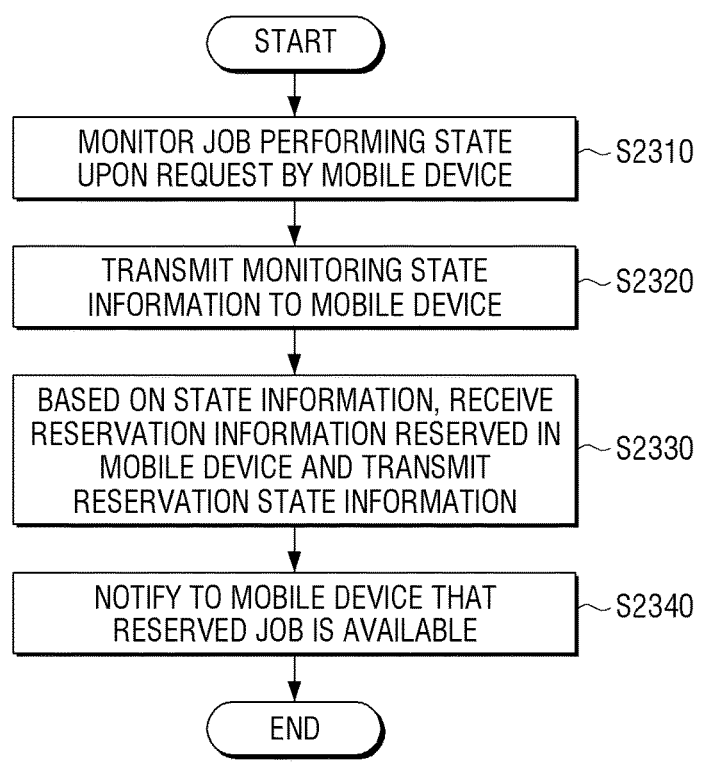

FIG. 1 is a view illustrating an image reading system according to an exemplary embodiment, FIG. 2 is a view illustrating an image reading method, FIG. 3 is a view illustrating brief configuration of the image scanning apparatus of FIG. 1, FIG. 4 is a view illustrating a detailed configuration of the image scanning apparatus of FIG. 1, FIG. 5 is a view illustrating a detailed configuration of the mobile device of FIG. 1, FIGS. 6-9 are views illustrating various types of an identification mark according to an exemplary embodiment, FIG. 10 is a view illustrating an example of a user interface window displayable on the mobile device of FIG. 1, FIG. 11 is a flow chart to describe an image reading method according to an exemplary embodiment, FIG. 12 is a view illustrating an image reading system according to the second exemplary embodiment, FIG. 13 is an image reading system according to the third exemplary embodiment, FIG. 14 is a view illustrating operations between the mobile device of FIG. 12 and the image scanning apparatus, FIG. 14 is a block diagram exemplifying a detailed structure of the mobile device of FIG. 12 or the terminal device of FIG. 13, FIG. 16 is a block diagram indicating a changed example of FIG. 14, FIG. 17 is a view illustrating detailed structure of the image scanning apparatus of FIG. 12 or the MFP of FIG. 13, FIG. 18 is a view illustrating a detailed structure of offline job reservation unit of FIG. 17, FIG. 19 is a view illustrating a reservation process of offline job according to an exemplary embodiment, FIG. 20 is a view to describe a reservation process, FIG. 21 is a view to describe a user notice, FIG. 22 is a flow chart illustrating a job reservation method to form an image offline according to an exemplary embodiment, and FIG. 23 is a flow chart illustrating a method for performing reservation job to form an image offline according to an exemplary embodiment.

MODE FOR INVENTION

An exemplary embodiment will be further described with reference to the attached drawings.

FIG. 1 is a view illustrating an image reading system according to an exemplary embodiment.

Referring to FIG. 1, an image reading system 1000 includes an image scanning apparatus 100 and a mobile device 200.

The mobile device 200 displays a UI to control a function of the image scanning apparatus 100, and receives a scanning command with respect to the image scanning apparatus 100 through a displayed UI. In addition, the mobile device 200 may transmit an input scanning command to the image scanning apparatus 100, and receive scanning data, an output according to a scanning command, from the image scanning apparatus 100.

In the meantime, when the image scanning apparatus 100 already performs another scanning job, the mobile device 200 may transmit the aforementioned scanning command as a scanning reservation command (or the second scanning command). In this case, information regarding an identification mark (or a scanning identifier) which can discern the former scanning document with a new scanning document can be transmitted together. For detailed configurations and operations of the mobile device 200, it will be described with reference to FIG. 5. Here, the mobile device 200 may be a notebook, a mobile phone, a smartphone, PMP, MP3 player.

The image scanning apparatus 100 scans a document and generates a scanning image. To be specific, the image scanning apparatus 100 sequentially scans a plurality of documents to generate a plurality of scanning images.

In the meantime, when receiving a scan reservation command from the mobile device 200 while conducting the first scanning job, the image scanning apparatus 100 may detect whether there is a document including a preset identification mark during scanning a plurality of documents and process a document prior to sensing the identification mark with the first scanning job on-going.

The image scanning apparatus 100, after sensing the identification mark, may proceed with the second job regarding a document where there is an identification mark and a document after the document. The configurations and operations of the image scanning apparatus 100 will be described with reference to FIGS. 3 and 4. Here, the image scanning apparatus 100 may be not only a scanner performing scanning job but also a facsimile or MFP performing scanning, copying, and faxing.

The image reading system 1000 according to the exemplary embodiment may, even when the image scanning apparatus 100 is performing scanning job, reserve a new scanning job, and the image scanning apparatus 100 may proceed with a plurality of scanning jobs without pause. Therefore, a user may not wait for completion of the scan job which is on-going and thus user convenience is improved.

In describing FIG. 1, it is illustrated that one mobile device is connected to one image scanning apparatus, but for embodiment, one mobile device can be connected to a plurality of image scanning apparatuses, and each of image scanning apparatus can be connected to a plurality of mobile devices.

In addition, for embodiment, each device can be directly connected, and also can be indirectly connected using router and another device (for example, server). In addition, in the illustrated example, each device is connected by wire, but for embodiment, each device can be connected wirelessly.

In addition, when describing FIG. 1, it is described that a user enters a scanning command through a mobile device, but for embodiment, a second scanning command (that is, scanning reservation command) can be input by the image scanning apparatus.

When describing FIG. 1, it is described that scanning job of the image scanning apparatus 100 can be requested through the mobile device 200, but, if the image scanning apparatus can perform jobs other than the scanning job, the mobile device 200 may perform control for various functions supported by the image scanning apparatus 100.

FIG. 2 is a view illustrating an image reading method.

Referring to FIG. 2, a user may select the image scanning apparatus to perform scanning job using the mobile device 200 (S201). To be specific, the mobile device 200 may search for a connectable image scanning apparatus, and display the searched image scanning apparatus to a user.

A user may select the image scanning apparatus 100 for performing scanning job from among a displayed image scanning apparatus. In the meantime, during display of the searched image scanning apparatus, the mobile device 200 may display an operation state (to be specific, whether to perform current operation) of each of the searched image scanning apparatus.

A user may select a scanning option of the scanning job to be done by the selected image scanning apparatus 100 (S202). To be specific, an interface window to select a scanning option provided by the image scanning apparatus 100 selected by a user may be displayed and a user can select a scanning option through a user interface window.

At this time, a displayed interface window may be a UI window generated from the selected image scanning apparatus 100, and may be a UI window generated by the mobile device 200 through option information provided from the selected image scanning apparatus 100.

When a user selects a scanning option, the mobile device 200 may transmit a scanning reservation command to the image scanning apparatus 100. In response to the above, the image scanning apparatus 100 may generate a PIN number corresponding to the requested scanning reservation command (S203).

In addition, the image scanning apparatus 100 may notify the generated PIN number to the mobile device 200. Here, the PIN number may be a number which consists of a number which can identify job requested by a user of the mobile device 200 or the mobile device 200.

Accordingly, a user may recite the notified PIN number on a preset paper (for example, a writing paper to recite a PIN number on a preset area), and locate a paper where the PIN number is recited to be in the first page of a document, and load it on a loading unit of the image scanning apparatus 100 (S204).

Accordingly, in the loading unit of the image scanning apparatus 100, a document of which scanning is on-going (or a part of a plurality of documents), a paper where a PIN number is recited (that is, a writing paper), and a document of the second scanning job can be loaded on the loading unit. In the meantime, a type of a paper where PIN number is recited will be described with reference to FIG. 6.

Therefore, the image scanning apparatus 100 sequentially scans a document filed on a loading unit and sequentially generates a scan image of each document. The image scanning apparatus 100 senses whether a PIN number is included in a scanned image generated during a process of generating a scanned image, and if a scanned image including a PIN number is sensed, a job thereafter is considered a second scan job, a first scan job is terminated, and scanning process according to the second scan job can be performed. In addition, the scanning data generated according to the second scan job can be transmitted to the mobile device 200 (S205).

For example, if the second job (reserved scan job) which scans a document in color and transmits it to the server A is received during the first job which scans a document in black and white and transmits it to a mobile device, the image scanning apparatus 100 may transmit a plurality of color scan image to server A which is generated prior to document where PIN code is written, and a plurality of scan images generated after document with PIN code are processed as black and white image, and generated black and white scan image can be transmitted to the mobile device 100.

As such, the image scanning apparatus according to an exemplary embodiment, even if the first job in the image scanning apparatus 200 is not yet completed, the user may request performing a new second scanning job to the image scanning apparatus, and the image scanning apparatus may perform a plurality of scanning jobs continuously without pause.

Regarding FIG. 2, it has been described using a PIN number as a preset identification mark, but when embodying, a barcode, QR code, and a preset shape (for example, red star mark, blue triangle, etc.) can be used. Various identification marks will be described later with reference to FIGS. 6-9.

Here, barcode is a code which can be optically read by combining vertical rods with different width to express numbers or special letters in a form readable by machine. In addition, the QR code is a bar code in matrix shape indicating information in black and white grid pattern.

In addition, in describing FIG. 2, it has been described that a preset identification mark is written on a separate writing paper, but when embodying, a preset identification mark can be written on the first page of a document without a separate writing paper. In addition, it has been described that a user directly writes a preset identification mark on a writing paper, but already made code (for example, bar code, QR code, etc.) can be written on a document. The above example will be further described with reference to FIGS. 7 and 8.

In the meantime, when describing FIG. 2, it has been described using an object identifiable by using OCR, such as PIN number, bar code, QR code and preset shape as a preset identification mark, but if the image scanning apparatus 100 detects a special fluorescent material, a fluorescent material which the image scanning apparatus 100 may detect can be used as a preset identification mark.

In addition, as a preset identification mark, writing paper having a specific size can be used. For example, paper of A5 of which size is smaller than ordinary document size A4 is disposed between two documents, and the image scanning apparatus 100, in response to detecting predetermined paper size, recognize document after the paper as a new document.

FIG. 3 is a view illustrating brief configuration of the image scanning apparatus of FIG. 1.

Referring to FIG. 3, the image scanning apparatus 100 may include the scanner 110 and the controller 120. The image scanning apparatus 100 may be a scanner which can perform scanning but also a facsimile and MFP which can perform other printing, copying, faxing, etc.

The scanner 110 scans a filed document to generate a scan image. To be specific, the scanner 110 may be embodied as a flatbed type of an ADF type, but in the exemplary embodiment, a plurality of documents need to be scanned and thus, a plurality of documents filed on the ADF can be sequentially read and a plurality of digital image data can be generated.

In addition, the scanner 110 may generate a scan image according to a set scan option. To be specific, the scanner 110 may scan a document according to scan options set through a manipulation inputter 150 or a communication interface 130 to be described later.

Here, the scan option may include scan area, scan resolution, and scan function options (for example, scan area, scan resolution, color scan, both sides scan, etc.) related to scanning operation and image processing options (for example, color adjustment of a scan image, conversion to black/white scan, file attribute of a scan image, etc.) to be processed by an image processor 180 to be described later.

Therefore, the scanner 110 may generate a scan image by scanning a document according to a scan function option from among set scan options.

In the meantime, the scanner 110, after the second scan job command is input, may perform scan job of a next document (or other side) based on the detected result of the identification mark. To be specific, when the second scan job is to be different from the first scan job (that is, when the scan option of the first scan job is different from the scan option of the second scan job option), the scanner 110 may perform scan job of a next document when a preset identification mark does not exist on a scan image of a previous page document.

For example, if the scan option of the first scan job is low resolution scan, but scan option of the second scan job is high resolution, scan method of a document needs to be changed. But, after performing scan job with low resolution, if it is confirmed that a document corresponding to the scanned image with low resolution is a document of a new job, scan data required by a user regarding a part of paper (or the first page) cannot be generated. Therefore, the scanner 110, after confirming whether the scan image of a previous document includes identification mark and then perform scan job for a next document.

A such, jobs of which scan method is different need to be performed serially, it is desirable that an identification mark is desirable on a separate writing paper other than a document. Therefore, the image scanning apparatus 100, by comparing a scan option selected by a user and an scan option already performed, if a second scan option of which scan method is different is selected by a user, may propose displaying the identification mark on a writing paper.

In the meantime, if a function option of the first scan job and the second job is the same, an operation to perform scan job according to proposal and detection result as described above can be omitted.

The controller 120 controls each configuration in the image scanning apparatus 100. To be specific, the controller 120, if a scan command is received through the manipulation inputter 150 or the mobile device 200, may control the scanner 110 to perform a scan job according to the received scan command.

In addition, while performing the current scan job, if an additional scan command (that is, scan reservation command) is input, the controller 120 may generate a PIN code, and control the communication interface 130 to transmit the generated PIN code to the mobile device 200, or control the display 140 to display the generated PIN code. At this time, if the image scanning apparatus 100 is a device which can perform printing job, the controller 120 may control an image forming unit 190 to output a printout including the generated PIN code.

In addition, the controller 120 detects whether there is a preset identification mark on the generated scan image. To be specific, the controller 120, when the second scan command (or scan reservation command) is input through the mobile device 200 or the manipulation inputter 150, may detect whether there is a preset identification mark regarding a scan image generated after the scan reservation command is input.

To be specific, the controller 120 may conduct OCR (Optical Character reader) for the generated scan image and detect whether a preset identification mark (for example, PIN code, barcode, QR code, and preset shape) is included. In the meantime, performing OCR requires additional time, and in order to minimize increase in scan time due to OCR, presetting for an area where a preset identification mark is to be disposed can be done. For example, when an upper part of a document is designated at a preset position, the controller 120 may conduct OCR for an upper part of the generated scan image to determine whether there is a preset identification mark.

In addition, detecting the identification mark can be performed after input of a scan reservation command of a user to detection of an identification mark. To be specific, until a user's scan reservation command is input, one job is to be processed. In this sense, detecting an identification mark is not necessary. In addition, documents after detecting the identification mark is a document corresponding to a scan reservation command and thus, it is not necessary to make additional identification mark. In the meantime, when the image scanning apparatus receives a plurality of scan reservation commands, even after one identification mark is detected, until the identification mark corresponding to the last scan reservation command, an operation to sense a preset identification mark can be performed continuously.

In addition, the controller 120 performs the first job for a document before detecting identification mark is detected, may control the scanner 110 so that a scanning job according to a scan function option can be performed, and perform image processing according to image processing option of the scan option of the first job with respect to a scan image generated by the scanner 110.

In the meantime, if the image scanning apparatus 100 is a device which can perform a job other than a scanning job, the on-going first job is not only a scan job but also copying job and fax transmission job. Therefore, the controller 120 may enable that a function (that is, printing, and fax transmission) corresponding to the first job can be additionally performed.

In addition, the controller 120, when an identification mark is detected, considers that a scan job according to the first job is completed, performs subsequent processing (for example, generating PDF, etc.) for the generated scan images, and transfer the finally generated scan result to a device according to the first job.

In addition, the controller 120, when an identification mark is detected, for a document where an identification mark is detected and documents after the document can be processed with a second job according to a scan reservation command. To be specific, when a scan option according to a scan reservation command is different from a scan option of the first job, the controller 120 may control the scanner 110 to perform a scan job based on a changed scan option.

In addition, the controller 120 determines whether an identification mark includes only an identification mark or other information. That is, the controller 120 may determine whether an identification mark is marked on a writing paper or a document. When a document includes an identification mark only, that is, if it seems that an identification mark is included in a writing paper, the controller 120 may process a scan image after the corresponding document excepting a document including an identification mark with a second job. In the meantime, if a document includes information other than an identification mark, the controller 120 may perform image processing to delete an identification mark from a scan image including an identification mark, and process a scan image after a document including a scan image and an identification mark with a second job.

Further, the controller 120 may perform image processing according to an image processing option of the second job scan option with respect to a document where the identification mark is detected and a scan image generated after the document. In the meantime, if the image scanning apparatus 100 is a device which is capable of other jobs as well, the second job may be not only scan job but also copy job and fax job. Therefore, the controller 120 may enable that a function (that is, printing job and faxing job) corresponding to the second job is performed.

That is, the present invention is not only applied to the case of performing a second scan job during the first scan job but also to the cases of performing a new first scan job during the first copy job, performing a new second copy job during the first copy job, performing a new first faxing job during the first scan job, performing a first fax job during the first copy job, and performing a new second fax job during the first fax job.

The controller 120, when scan job is completed, may notify that a scan job is completed to the mobile device 200 requesting a scan job. This notice can be embodied by using various methods such as SMS, messenger, application notice, etc.

As such, the image scanning apparatus 100 according to an exemplary embodiment may receive a new scan job during performing a current scan job, and proceed a plurality of scan jobs without pause. Therefore, user's convenience would be improved as a user does not need to wait for a scan job which is on-going.

Hereinabove, the brief configurations of the image scanning apparatus 100 are illustrated and described, but image scanning apparatus 100 may further include other configurations as well. For further configurations of the image scanning apparatus 100, it is described with reference to FIG. 4.

FIG. 4 is a view illustrating a detailed configuration of the image scanning apparatus of FIG. 1.

Referring to FIG. 4, the image scanning apparatus 100 may include the scanner 110, the controller 120, the communication interface 130, the display 140, the manipulation inputter 150, a storage 160, an identifier 170, an image processor 180, and an image forming unit 190.

The scanner 110 is the same as the element which refers to FIG. 3, and thus, duplicate description would be omitted.

The communication interface 130 is connected to an external device and/or a mobile device, and the scan data scanned from the image scanning apparatus 100 can be transmitted to the mobile device 200 and/or an external device. To be specific, the communication interface 110 is formed to connect the image scanning apparatus 100 with an external device, is connected to the mobile device through LAN (Local Area Network) and internet network, but also can be accessed through the USB (Universal Serial Bus). In the meantime, it has been described that a scan image is transmitted to the mobile device 200, but when a user sets a place for storing a generated scan data as a specific server or storage, the communication interface 130 may transmit scan data generated in a specific server or storage.

The communication interface 130 may receive a scan command through the mobile device 200. At this time, the communication interface 130 may receive information of a scan option corresponding to the scan command together. In the meantime, when a scan option is not set separately from a user, the image scanning apparatus 100 may set a scan option which is set as a default as a scan option of the scan command.

In the meantime, when a user's scan command is not directly worked by the current image scanning apparatus 100 but is a scan reservation command, the communication interface 130 may receive information corresponding to the preset identification mark as well.

For example, information corresponding to the preset identification mark may be a type of an identification mark (for example, PIN code, barcode, QR code), information of the identification mark (for example, information included in PIN code, bar code or QR code).

Hereinabove, it is described that a scan command (or a scan reservation command) is received through the communication interface 130, but it can be received from the image scanning apparatus 100 through the manipulation inputter 150. In this sense, the communication interface 130 and the manipulation inputter 150 can be operated as an inputter which receives a scan job command.

In the meantime, in case of the PIN code, it can be generated by the image scanning apparatus 100, and the communication interface 130 may notify the information regarding the generated PIN code to the mobile device 200.

In addition, the communication interface 130, when receiving a scan command from the mobile device 200, if scan job is completed according to the scan command, may notify the mobile device 200 that a scan job is completed.

In the meantime, the communication interface 130 may be connected with the mobile device 200 through NFC, Wi-Fi direct, and Bluetooth. At this time, the communication interface 130 may be connected to the mobile device 200 by using the communication methods in an integrated manner. For example, through NFC connection method, a scan command may be received from the mobile device 200, and at this time, by receiving IP address of the mobile device 200, completion of scanning can be notified through Wi-Fi direct or network methods.

The display 140 displays various information provided by the image scanning apparatus 100. The display 140 may be a monitor such as LCD and CRT, and can be embodied as a touch screen which can concurrently perform a function of the manipulation inputter 150.

In addition, the display 140 may display whether the image scanning apparatus 100 performs a current job. The display 140 may display a user interface window to receive a setting of a scan option regarding a new scan job.

In the meantime, when the image scanning apparatus 100 is under a scan job, the display 140 may display that a current scan job command is input as a scan reservation command, and display that an identification mark is necessary for division of a document. At this time, when a scan option set by a user with respect to a new job is different from a scan option which is previously performed, that is, a scan method of a new scan job is different from a scan job which is being performed, the display 140 may notice that an identification mark needs to be displayed at a separate writing paper.

The display 140 may display a PIN code which is to be used as an identification mark, or display a user input screen to receive an identification mark (or display shape and type) used by a user. At this time, the display 140 may display a screen to receive an area where an identification mark is located.

In addition, the display 140 may display a progress status of the on-going job, and when a scan job is completed, completion of the scan job can be displayed.

The manipulation inputter 150 receives from a user a scan command (or a scan reservation command). To be specific, the manipulation inputter 150 has many function keys that a user can set or select various functions provided by the image scanning apparatus 100. The manipulation inputter 150 may be embodied as a plurality of buttons, keyboards, and mouse, and a touch screen which can concurrently perform a function of the display 140 above.

The manipulation inputter 150 may receive a scan option with respect to an input scan command or a scan reservation command. The manipulation inputter 150, if a scan reservation command is input, may receive an identification mark (or display type and shape) corresponding to the scan reservation command. In addition, the manipulation inputter 150 may receive information regarding a position where the identification mark is present.

In addition, the manipulation inputter 150 may receive user information (for example, authentication information (ID, password), member ID, telephone number, host device address, etc.). Information of a user, when the scan job is completed, may be used to notify completion of a job.

The storage 160 may store a scanned scan image. To be specific, the storage 160 may store the first scan image (a scan image with respect to a document before a document where the identification mark is present) generated in the scanner 110 and the second scan image (a document where the identification mark is present and a scan image thereafter).

In addition, the storage 160 may store an output generated by the image processor 180. The storage 160 may be embodied as a storage medium within the image scanning apparatus 100, an external storage medium, for example, a removable disk including an USB memory, a storage medium connected to host, and a web server through network, etc.

An identifier (170 or OCR unit) may detect whether a preset identification mark is present in the scanned scan image. To be specific, the identifier 170 may perform OCR to detect whether there is a PIN code input from a user, or notified to a mobile device. Or, it may detect a preset identification mark by sensing whether there are bar code and QR code in an entire area of a scan image, and confirm whether the detected bar code or QR code includes information corresponding to the identification mark received from a user. Or, by detecting whether there is a preset type (shape or color) in an entire document of a scan image, may detect a preset identification mark.

In the above, it has been described to detect whether there is a preset identification mark for an entire area of the scan image, but if a user sets an area where an identification mark is located, or a position thereof is determined in advance, whether there is an identification mark for a preset area can be detected to more rapidly detect an identification mark.

In the meantime, the detection operation of the identification mark is not always performed but can be performed after inputting a scan reservation command by a user. When one scan reservation command is input, after one identification mark is detected, the above operations can be terminated.

In the meantime, if an identification mark is a writing paper of fluorescent material and a preset size rather than PIN code, bar code, QR code, and a preset object, the identifier 170 may detect whether there is fluorescent material in a scanned document and the document has a preset size.

The image processor 180 performs image processing with respect to a scanned document. To be specific, the image processor 180, from among scan options corresponding to the scan job, may perform image processing of a scan image generated in response to an image processing option.

For example, when options such as color adjustment option, black and white option, PDF conversion option are set as scan options, the image processor 180 may perform the image processing corresponding to the options with respect to the scan image generated by the scanner 110.

In the meantime, though can be performed in parallel with a process of generating a scan image, options in the case where a scan image is necessary such as conversion to PDF can be performed after all the document scan is completed.

In the meantime, when the identification mark is detected, the image processor 180 may divide whether a document including the identification mark only or other information as well.

As a result of the division, when a document including the identification mark includes an identification mark only, the image processor 180 may generate only a scan image with respect to remaining document excluding a document including the identification mark as scan data.

In contrast, when a document including the identification mark includes other information as well, the image processor 180 may perform image processing to delete an area including the identification mark from a scan image of a document including the identification mark, and generate a scan image with respect to remaining document excluding a document including the image processed scan image and the identification mark as one scan data. In the above, it is described that an identification mark only is deleted from a scan image of a document including the identification mark, but if a user attaches a small paper displaying an identification mark to a document, the image processor 180 may perform image processing to delete all the areas of the small paper including the identification mark.

The image forming unit 190 may print a printout including an identification mark corresponding to the second job. To be specific, when the image scanning apparatus 100 is a MFP or a fax, and an on-going job is not a job using the image forming unit 190, the image forming unit 190 may print printout including an identification mar corresponding to the scan reservation command, in response to the scan reservation command of a user.

In addition, the image forming unit 190, when the first job and/or the second job is a printing job, may perform printing job regarding the scan image generated from the scanner 110. In the meantime, when the image scanning apparatus 100 may perform fax transmission, the image scanning apparatus 100 may further include a function for fax transmission, and may transmit the scan image generated from the scanner 110 via fax.

As such, the image scanning apparatus 100 according to an exemplary embodiment may receive a new scan job while performing the current scan job, and may continue a series of scanning job without pause of job. Therefore, a user may not need to wait for completion of the on-going scan job and thus, user convenience would be improved.

In describing FIG. 4, it has been illustrated that the controller 120, the identifier 180, and the image processor 180 are separate configurations, but during embodiment, they can be one composition (SoC).

FIG. 5 is a view illustrating a detailed configuration of the mobile device of FIG. 1.

Referring to FIG. 5, the mobile device 200 may include the communication interface 210, the display 220, a manipulation inputter 230, a storage 240, and a controller 250. Here, the mobile device 200 may be a notebook, a mobile phone, a Smartphone, a PMP, and an MP3 player communicable with the image scanning apparatus 100.

The communication interface 210 is formed to connect the mobile device 200 with an external device, and has not only a format to be accessed through LAN (Local Area Network) and Internet network, but also can be accessed through the USB (Universal Serial Bus) port and wireless module. Here, the wireless module may be WiFi, WiFi Direct, NFC, Bluetooth, and IR.

The communication interface 210 may search for a connectable image scanning apparatus 100. In addition, the communication interface 210 may receive information regarding a function and operation status information of the connectable image scanning apparatus 100. At this time, the communication interface 210 may receive information for controlling a function of the image scanning apparatus 100 and information for setting an option of a function, or receive UI for setting an option of a function.

In addition, the communication interface 210 may receive information regarding a scan option supported by the selected image scanning apparatus 100. To be specific, the communication interface 210 not only receives information for displaying a UI relating to the scan option setting, but also directly receives UI relating to the scan option setting.

The communication interface 210 may transmit a scan command or a scan reservation command to the selected image scanning apparatus 100. At this time, the communication interface 210 may transmit information regarding a scan option regarding the scan command or the scan reservation command.

In addition, the communication interface 210 may transmit information regarding a preset identification mark to discern a document when transmitting a scan reservation command. For example, information corresponding to a preset identification mark may be a type of the identification mark (for example, which identification mark from among PIN code, bar code, QR code), information of an identification mark (for example, information included in the PIN code, bar code or QR code).

In the meantime, it has been described that the communication interface 210 transmits information regarding the preset identification mark to the image scanning apparatus 100, but when embodying, the image scanning apparatus 100 may generate a PIN code which is an example of the identification mark, and the communication interface 210 may receive information regarding the generated PIN code.

The communication interface 210 may receive information regarding a job progress in the image scanning apparatus 100, and when a scan job is completed in the image scanning apparatus 100, may receive a notification of scan job completion. In addition, the communication interface 210 may receive scan data which is a scan output.

The display 220 may display various information to the mobile device 200. The display 220 may be a monitor such as LCD, CRT, and can be embodied as a touch screen which can simultaneously perform a function of the manipulation inputter 230 to be described later.

The display 220 may display an application list installed in the mobile device 200. In addition, the display 220 may display an execution screen according to operation of an application.

The display 220 may display a screen to select an image scanning apparatus for performing a job. At this time, the display 220 may display a position of the image scanning apparatus in a map type. The display 220 may display the position and the job progress of the image scanning apparatus together.

The display 220 may display a screen for selection of a job to be performed by the image scanning apparatus. To be specific, the display 220 may display a screen to receive a function to be performed by the image scanning apparatus and option of function (for example, scan option). In the meantime, it has been described that, after the image scanning apparatus is selected, it receives selection of a scan option, but when embodying, the job can be selected first and then the image scanning apparatus can be selected.

The display 220 may display a screen to receive selection of a preset identification mark. Through this, a user may input to the manipulation inputter 230 a PIN code, information regarding generated QR code, bar code, or information in a preset shape to be displayed on a document. In the meantime, when using a pre-generated QR code or bar code, a user may photograph QR code or bar code using a photographing device provided on the mobile device 200, to obtain information regarding the identification mark, and use the same.

In the meantime, when the image scanning apparatus 100 generates a PIN code and the communication interface 210 receives a generated PIN code, the display 220 may display a PIN code to be displayed on a document or a writing paper. In the meantime, when a printing option set by a user is different from a printing option performed by the image scanning apparatus 100 in terms of a printing option and a print function option, the display 220 may notify that a preset identification mark needs to be displayed on a writing paper.

The display 220 may display a job progress of a requested job. When ending of a scan job is received through the image scanning apparatus 100, the display 220 may display ending of the requested job. In this case, an example of a user interface window will be described with reference to FIG. 10.

The manipulation inputter 230 includes a plurality of function keys which can be set or selected by a user. The manipulation inputter 230 may be embodied as a device such as a mouse and a keyboard, and a touch screen which can perform a function of the display 220 simultaneously.

The manipulation inputter 230 may receive an application driving command. To be specific, a user, when performing a job using an image scanning apparatus, may drive an application installed on the mobile device 200, or input a driving command with respect to a web browser application to access a specific web page.

In addition, the manipulation inputter 230 may receive selection of a specific application from among an application list installed on the mobile device 200 displayed on the display 220.

The manipulation inputter 230 may receive selection of the image scanning apparatus. To be specific, the manipulation inputter 230 may receive selection of the image scanning apparatus from among nearby image scanning apparatuses displayed on the display 220.

In addition, the manipulation inputter 230 may receive a job to be performed by the selected image scanning apparatus. To be specific, the manipulation inputter 230 may receive a function and an option of a function (for example, scan option, etc.) to be performed by the selected image scanning apparatus.

The manipulation inputter 230 may receive a type and information of the identification mark to specify a document of a user. The operation may be embodied by using a photographing device provided on the mobile device 200.

The storage 240 may store information and scan data received through the communication interface 210. The storage 240 may include a storage medium in the mobile device 200, external storage medium, for example, a removable disk including USB memory and web server through network.

The controller 250 performs control regarding each configuration of the mobile device 200. To be specific, the controller 250, when receiving from a user a driving command of an application to use the image scanning apparatus, may control the communication interface 210 to search for the image scanning apparatus.

The controller 250 may control the display 140 and the manipulation inputter 150 to display and select a searched image scanning apparatus. In addition, the controller 250 may control the display 140 and the manipulation inputter 150 to receive selection of a function and a function option to be performed by the selected image scanning apparatus. In addition, the controller 250 may control the display 140 and the manipulation inputter 150 to receive information regarding the identification mark for identifying a document.

In the meantime, a scan option selected by a user may be pre-transmitted to the selected image scanning apparatus 100, and in this case, the image scanning apparatus 100 may notify information regarding a position of the preset identification mark and application of a writing paper to the mobile device 200. Therefore, the controller 250 may control the display 140 whether to display an identification mark using a writing paper based on information provided from the image scanning apparatus 100, and information regarding a position of the identification mark.

The controller 250 may control the communication interface 210 to transmit a scan option input by a user, scan command including information regarding the identification mark. The controller 250, when scan job completion is notified through the communication interface 210, may control the display 220 to display completion of job.

As described above, the mobile device 200 according to the exemplary embodiment may control the image scanning apparatus from the mobile device 200, and when a selected image scanning apparatus 100 uses a scan function, it may request a new scan job and user convenience would be improved.

FIGS. 6-9 are views illustrating various types of an identification mark according to an exemplary embodiment.

Figure 6:
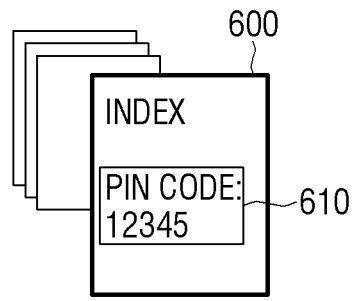

To be specific, FIG. 6 is an example of using a PIN code as an identification mark.

Referring to FIG. 6, the identification mark is displayed on a separate writing paper 600. In addition, in the preset area 620 of the writing paper 600, a PIN code is recited. The writing paper can be provided by image scanning apparatus 100 as a printout, and a user may recite a PIN code on a printout where the PIN code is not indicated.

The PIN code used here may be generated by the image scanning apparatus 100, and displayed on the display 140 of the mobile device 200 or the image scanning apparatus 100. Or, it may be generated by the mobile device 200, and information regarding the PIN code may be provided to the image scanning apparatus 100.

Figure 7:
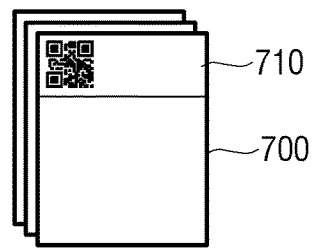

FIG. 7 is an example of using QR code with an identification mark.

In FIG. 7, it is illustrated that the QR code is attached to a small paper 710 on the first page 700 of the document. For example, the separate small paper is a paper which can be detached or attached to the document, and a user may attach the small paper on an area which does not hide the contents of the document. In the small paper, QR code may be printed in advance and attached to around the image scanning apparatus. Therefore, a user may attach a small paper where the QR code is illustrated around the image scanning apparatus to the first page of the document.

In the meantime, a location of the document where the small paper is attached can be free or preset. To be specific, if the position of the small paper is limited as contents are written in the document, a user may attach the small paper within a scope not hiding the contents of the document, and set a position to attach the QR code on the mobile device 200 or the image scanning apparatus 100.

Or, a position where the mobile device 200 or the image scanning apparatus 100 would be attached may be displayed and a small paper can be attached to a position provided. Information regarding the QR code may receive QR code information by photographing by the mobile device 200, and the read information can be transmitted to the image scanning apparatus 100.

Here, the QR code may be a QR code including information of a specific user and can be used as an identifier to indicate a new scan document without specific information.

FIG. 8 is an example of using a barcode as an identification mark.

Referring to FIG. 8, a bar code is attached through the small paper 810 on a first page 800 of the document. For example, the separate small paper is detachable paper to the document, and a user may attach the small paper on an area not hiding the contents of the document.

In addition, the small paper can be disposed around the image scanning apparatus and the bar code can be pre-printed. Therefore, a user may detach one of the small paper where the bar code around the image scanning apparatus and attach to the first page of the document.

In the meantime, a position of the document where the small paper is attached be free or preset. To be specific, when a position of attaching the small paper where contents of the document are written is limited, a user may attach the small paper within a range not hiding the contents of the document, and set a position to attach the bar code on the mobile device 200 or the image scanning apparatus 100.

Or, the mobile device 200 or the image scanning apparatus 100 may display a position where the bar code is to be attached, and a user may attach the small paper on a provided position. Information about the bar code can be read through photographing by the mobile device 200, and the read information can be transmitted to the image scanning apparatus 100.

In the meantime, the bar code used here can be a bar code including information of a user, and used as an identifier to indicate a new scan document without separate information.

FIG. 9 is an example of using a star shape as an identification mark.

Referring to FIG. 9, a star shape figure is illustrated in a preset position of the document. A user may draw a preset shape (star, triangle, etc.) on a preset area of document with preset color.

FIG. 10 is a view illustrating an example of a user interface window displayable on the mobile device of FIG. 1.

Referring to FIG. 10, a user interface window 1010, based on the scan job completion notice transmitted by the image scanning apparatus 100, may display completion of the job. Therefore, a user may do not need to completion of the first job and the second job in front of the image scanning apparatus 100.

FIG. 11 is a flow chart to describe an image reading method according to an exemplary embodiment.

Referring FIG. 11, a filed document is scanned and the scan image is generated (S1110). To be specific, document is sequentially read on the ADF, and a plurality of digital image data (that is, the scan image) can be generated. In this case, the scan image can be generated based on a scan option which is set regarding the job.

In addition, it is detected whether a preset identification mark is present on the generated scan image (S1120). To be specific, when a scan reservation command is input, it can be detected whether a preset identification mark is present in a preset area of the scan image which is generated after the scan reservation command is input. That is, presence of the identification mark can be performed in parallel with generation of the scan image. For example, for the first document where the scan reservation command is input, when the first scan job and detection of the first identification mark are done sequentially, in the process of detecting the first identification mark regarding the first document, the second scan job can be performed simultaneously.

For the scan image before the document where the identification mark is present, proceed it with the first job, and for the scan image after the document where the identification mark is present, proceed it with the second job corresponding to the identification mark (S1130). To be specific, before the identification mark is detected, the first job can be processed.

If the identification mark is detected, it will be considered that the scan job is completed according to the first job, and subsequent handling (for example, generation of PDF) for the generated scan images can be done and the final scan output can be transmitted to a device according to the first job. In addition, for the document where the identification mark is detected and the documents after the document, the second job according to the scan reservation command can be processed.

Therefore, the image reading method according to the exemplary embodiment may receive a new scan job even when the scan job is being performed, and a plurality of scan jobs can be promoted without pause of a job. Therefore, a user may not wait for completion of the on-going scan job and thus, user convenience would be improved. The image reading method as FIG. 11 can be executed on the image scanning apparatus having the configurations as FIG. 3 or FIG. 4, and on the image scanning apparatus having another configuration.

In addition, the above described image reading method may be realized as a program including algorithm executable in computer, and the program can be stored in a non-transitory computer readable medium and provided.

The non-transitory computer readable medium means medium which semi-permanently stores data and enables reading of device, instead of medium which stores data for a short period of time such as register, cache, and memory. To be specific, the various applications and programs can be stored in non-transitory readable medium such as CD, DVD, hard disk, Blue Ray disk, USB, memory card, and ROM, and provided.

FIG. 12 is a flow chart to describe an image reading method according to the first exemplary embodiment, FIG. 13 is a view illustrating an image reading system according to the second exemplary embodiment.

As illustrated in FIG. 12, the image reading system 1000' according to the second exemplary embodiment includes the mobile device 300, communication network 301, and a part or whole of an image scanning apparatus 400.

Here, including a part or whole means omitting some elements such as the communication network 301, or performing Wi-Fi direct communication by the mobile device 300 and the image scanning apparatus 400. To facilitate understanding of the invention, it will be described that whole is included.

The mobile device 300 is an offline job reservation request device, capable of displaying an image, and may include a Smartphone, PDA (Personal Digital Assistant), lap top computer, and tablet PC. The mobile device 300 according to the exemplary embodiment may perform a function of the mobile device 200 of FIG. 1.

The mobile device 300 performs reservation of offline job to perform a job in the image scanning apparatus 400 using a specific document offline such as copy, scan, and fax. Accordingly, printing means requesting online job and thus can be excluded from the exemplary embodiment. In addition, the mobile device 300 according to an exemplary embodiment may perform the process of requesting reservation and confirming a state of reservation request in a binary device. In other words, offline job reservation can be requested in a desktop computer, and a mobile device such as a mobile phone of a user other than a desk top computer can confirm state of a reservation request.

It will be further describe later, but the mobile device 300, when a user wishes to reserve an offline job, may perform a reservation operation by running a related application. During this process, the mobile device 300 may receive from the image scanning apparatus 400 monitoring state information to monitor use state of various function blocks such as scan, copy, or fax module and based on the received monitoring state information, performs reservation, transmit reservation information to the image scanning apparatus 400 according to reservation of a user, and manage a reservation state. After the reservation is completed, the mobile device 300 may receive reservation state information such as standby information, and when an order to perform offline job nears, may receive notice from the image scanning apparatus 400. In case of receiving a notice, the mobile device 300 may notify a user in a format of vibration, sound, message, or UI (User Interface) screen.

The communication network 301 includes wired and wireless communication network. Here, wire network includes cable network or PSTN network, and wireless communication network includes CDMA, WCDMA, GSM, EPC (Evolved Packet Core), LTE (Long Term Evolution), Wibro network. Therefore, when the communication network 301 is a wired communication network, access point can access to exchange bureau of a telephone exchange, but in case of wireless communication network, it may access to SGSN or GGSN (Gateway GPRS Support Node) for data processing, or access various relay bases such as BTS (Base Station Transmission), NodeB, and e-NodeB for data processing.

In addition, the communication network 301 includes AP such as Femto or Pico installed in buildings. Here, Femto or Pico is separated based on up to how many devices the mobile device 300 can access. Of course, AP includes short distance communication module to perform short distance communication with the mobile device 300 such as Jigbee and Wi-Fi. In the exemplary embodiment, short distance communication includes various specification such as RF (Radio Frequency) and UWB including Bluetooth, Jigbee, IrDA, UHF, VHF. Accordingly, the AP may extract a position of data packet, designate the optimal communication route with respect to the extracted position, and transmit data packet to the image scanning apparatus 400 according to the designated communication route.

The image scanning apparatus 400 is a device to perform offline job reservation, including a scanner, copy machine, fax machine, and RFP. The image scanning apparatus 400 may manage to reserve offline job with the mobile device 300 and facilitate offline job according to the reservation. In other words, the image scanning apparatus 400, when an application to reserve offline job is executed in the mobile device 300 according to a user command, that is, a user request, may receive information regarding a reservation request from the mobile device 300, and monitor current job performing state or operation state. In addition, state information regarding monitoring is transmitted to the mobile device 300. In addition, the image scanning apparatus 400, based on monitoring state information, may receive and manage reservation information regarding the offline job, monitor the offline job, and when the reserved offline job nears, notifies to the mobile device 300 of the user.

Furthermore, the image scanning apparatus 400, after such notification, may confirm whether there is offline job from a user within a preset time. To do this, the image scanning apparatus 400 may run a timer. For example, when there is no offline job from a user within 30 seconds, the image scanning apparatus 400 may pass to a next user the offline job. Therefore, the image scanning apparatus 400 may set lock so that another user cannot perform operation regarding the offline job of a user. For example, on a display screen of the image scanning apparatus 400, a UI screen for copy, scan, and fax can be displayed, and a lock function can be set to prevent touch In the meantime, the image scanning apparatus 400, if it seems that offline job which a next you wish to perform is not relevant, may not to set a lock function.

In the meantime, as illustrated in FIG. 13, according to the second exemplary embodiment, when comparing the image reading system 1000' with FIG. 12, the image reading system 1000' of FIG. 13 indicates that the mobile device 300 of FIG. 12 is a terminal device 300' such as desktop computer, and terminal device 100 performs wired communication with the communication network 110'. The image scanning apparatus 400 of FIG. 12 exemplifies an MFP 400' which integrates scan, copy, and fax functions. Excluding the above, the terminal device 300', the communication network 110', and the MFP 400' of FIG. 13 are not substantially different from the mobile device 300, the communication network 301, and the image scanning apparatus 400 of FIG. 12, and further description will be omitted.

The image reading system 1000' according to the exemplary embodiment may interlock print MFP and mobile devices by users to remove unnecessary operations to perform offline job, and may provide improved user experience to efficiently use MFP.

To be specific, by notifying a user of status of MFP, enabling a user to pre-set detailed option of a job, and enabling a MFP reservation and notification, unnecessary waiting time or unnecessary operation can be reduced.

In addition to the above, by providing a function to connect the MFP with a plurality of user's mobile devices, there would be an advantage to more efficiently use limited resources. For example, from among the plurality of searched image scanning apparatuses 400, by letting a user to select MFP, limited resource can be efficiently used.

In describing FIGS. 12 and 13, it has been described that the mobile device of FIGS. 12 and 13 illustrate a function different from that of the mobile device of FIG. 1, but when embodying, the mobile device of FIG. 12 may perform the function of the mobile device of FIG. 1 together, and when embodying, FIGS. 12 and 13 may be embodied to perform a function of the image forming apparatus of FIG. 1 as well.

FIG. 14 is a view illustrating operations between the mobile device of FIG. 12 and the image scanning apparatus.

Referring to FIG. 14 and FIG. 12, the mobile device 300 according to an exemplary embodiment performs offline job to perform offline job in the image scanning apparatus 400 with a document upon request of a user. To do this, the mobile device 300 may execute an application relating to reservation.

In contrast, the image scanning apparatus 400 such as MFP may perform 4 large operations for reservation job of the mobile device 300. First of all, the image scanning apparatus 400, when there is a reservation request from a user, may perform an operation to confirm a state, that is, to monitor (①). In addition, the image scanning apparatus 400 may proceed reservation information regarding reservation is made at which order, and alarm notification indicating that the order of offline job nears (②). In addition, the image scanning apparatus 400 may perform job option reservation operation to manage options with respect to reserved information, furthermore, option of specific offline job (③), and for a user whose job nears, a lock setting can be performed on a UI screen displayed on the display so that another user does not execute or occupy reserved job within predetermined time (④). If a predetermined time passes or a corresponding user would like to perform a job, the lock function can be released.

For example, a user which reserves a job can access to the image scanning apparatus 400, certify an actual person reserving the job through the NFC (Near Field Communication) and perform a job. By the above authentication operation, a lock function can be released. In other words, a user may transmit a user ID for reservation. The ID can be stored in NFC tag. Therefore, whether the transmitted user ID and user ID stored in the NFC tag are consistent can be confirmed.

Figure 15:
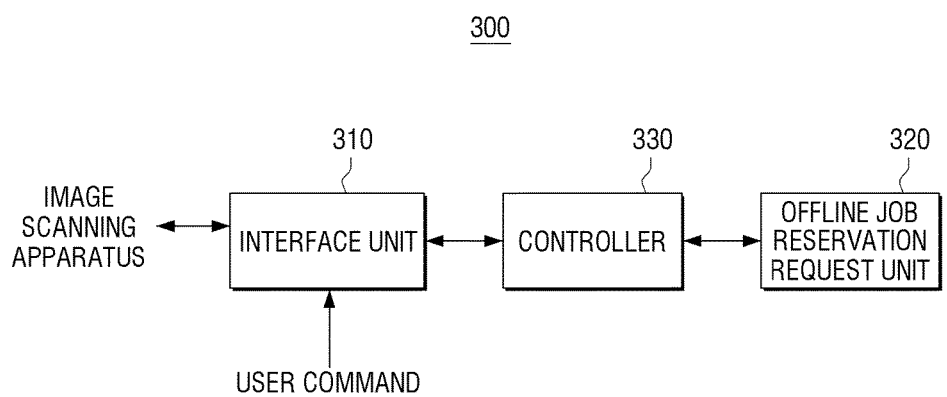

FIG. 15 is a block diagram which exemplifies a detailed structure of the mobile device of FIG. 12 or the terminal device of FIG. 13.

For easily explanation, when referring to FIG. 15 with FIG. 12, the mobile device 300 according to an exemplary embodiment includes a part or whole of an interface unit 310, an offline job reservation request unit 320, and a controller 330.

Here, including a part or whole means that the offline job reservation request unit 320 is integrated with the controller 330, or the interface unit 310 can be further integrated with the controller 330. For easier understanding, it would be described that whole is included.

The interface the interface unit 310 includes at least one of the communication interface 301 and the user interface 303, and the user interface may include at least one of the button unit and the display unit. The interface unit 310, through the communication interface, may perform a reservation operation regarding offline job of a user with the mobile device 300. For example, the interface unit 310 may receive a request regarding reservation of offline job through the communication interface.

The above request can be done according to a user command which is input through the user interface. For example, a user may press a direction key on a button unit and an enter key, or select/execute reservation-related application displayed on the display unit to receive a user command. If a user command is input, it can be determined and it is notified that there is a request of reservation to the image scanning apparatus 400.

The controller 330 controls overall operations within the mobile device 300. For example, when there is a user command through the interface unit 310, in order to execute reservation regarding the offline job, an offline job reservation request unit 320 can be operated. For example, when an application relating to the reservation is stored, the stored application can be executed to perform a reservation operation of the offline job. In addition, overall operation of the offline job reservation request unit 320 can be controlled. For example, when monitoring state information regarding monitoring of job performing state is received from the image scanning apparatus 400, this can be controlled to be displayed on the interface unit 310, for more accurately, on a display unit. In addition to the above, the controller 330 may control the offline job reservation request unit 320 and the interface unit 310 to transmit reservation information to the image scanning apparatus 400, and display information indicating that reservation state information and an order of offline job are nearing on the interface unit 310.

The offline job reservation request unit 320, for example, may perform a reservation process relating to the offline job to form an image relating to a document from the image scanning apparatus 400. To do this, the offline job reservation request unit 320, for example, may store a related application, execute the stored application, and proceed with overall operations relating to reservation, that is, information. The processed result is provided to the controller 330.

In FIG. 15, the interface unit 310, for more accurately, the communication interface or the controller 330 may include a tuner, demodulator, and decoder to proceed with general video data. From among the above, the decoder can be included in the interface unit 310, and perform information, that is, data conversion operation.

FIG. 16 is a block diagram indicating a changed example of FIG. 15.

Referring to FIG. 16, the mobile device 300 of FIG. 12 according to the exemplary embodiment may include a part or whole of the communication interface 301, user interface 303, offline job reservation request unit 320, controller 330, and the storage 340.

Here, including a part or whole means that some elements such as the storage 340 are omitted, and the offline job reservation request unit 320 can be integrated with the controller 330 or other element. For easy understanding, it will be described that whole is included.

As illustrated in FIG. 16, the communication interface 301, the user interface 303, the controller 330, and the offline job reservation request unit 320 are not substantially different from the interface unit 310, controller 330, and offline job reservation request unit 320 of FIG. 15 and thus will not be further described.

In the meantime, the storage 340 may store data and information as a processing result of the mobile device 300, and when there is a request of the controller 330, stored information can be output. Here, information can be distinguished from data in that information is simple information in a message type. For example, information includes simple contents such as a request and a response.

FIG. 17 is a view illustrating detailed structure of the image scanning apparatus of FIG. 12 or the MFP of FIG. 13, FIG. 18 is a view illustrating a detailed structure of offline job reservation unit of FIG. 17.

Referring to FIGS. 17 and 18 along with FIG. 12 for easy explanation, the image scanning apparatus 400 according to an exemplary embodiment includes a part or whole of a communication interface 410, a user interface 420, a controller 450, an offline job reservation unit 440, and a storage 430; includes a scanning unit, a fax transmitter and other various function blocks; and may further include time measuring unit such as a timer for measuring preset time.

Here, including a part or whole means that some elements such as the storage 430 are omitted, and the offline job reservation execution unit 440 can be integrated with the controller 450 or other element. For easy understanding, it will be described that whole is included.

The communication interface 410 receives a request for offline job reservation from the mobile device 300. In addition, the communication interface 410 may process various information which is generated from the reservation of the offline job. In other words, the communication interface 410, under the control of the controller 450, may monitor function blocks within the image scanning apparatus 400, or confirm reservation state, transmit monitoring state information to the mobile device 300, receive reservation information from the mobile device 300, and when the reservation is completed, transmit various information, to the mobile device 300, reservation information and that offline job nears.

The user interface 420 may include at least one of a button and the display unit. For example, the user interface 420 may display a UI screen on a display unit to execute operations such as scan, copy, and fax transmission. At this time, for the part to execute each operation on the UI screen, lock setting can be made under the control of the controller 450. In other words, this intends to give priority to a user whose reservation time nears by reservation than a user who tries to perform a job by accessing the image scanning apparatus 400 to be late than reservation time.

The controller 450 controls overall operations of the communication interface 410, user interface 420, offline job reservation execution unit 440, the storage 430 in the image scanning apparatus 400. For example, when there is a request for reservation regarding offline job through the communication interface 410, the information can be received and the offline job reservation execution unit 440 can be executed. In addition, the controller 450 may control the user interface 420 and the offline job reservation execution unit 440 so that monitoring state information, reservation information, reservation state information and notification information that job order regarding reservation nears are to be processed. In addition, various data and/or information which is to be processed internally can be stored in the storage 430.

The offline job execution unit 440, in advance to execution of the offline reservation job, monitors internal operation state or reservation state, generate and process monitoring state information, manage user reservation job list based on reservation information received from the mobile device 300, generate and process reservation state information such as standby number according to receipt of reservation information, and generate and process notification information notifying when the job order according to reservation nears.

In order to perform the above operation, the offline job reservation execution unit 440 may store a program or an application inside and execute them. For example, if separation in terms of hardware is available, as illustrated in FIG. 18, a part or whole of the state monitoring unit 441, reservation and notification unit 443, and the job reservation management unit 445 can be included. At this time, at least one block can be integrated with another block and implemented as a program type. The state monitoring unit 441 monitors internal job execution state of the image scanning apparatus 400. For example, it can be monitored whether function blocks such as a scanner and copy unit are being used, or there are how many people waiting for reservation. The reservation and notification unit 443, when reservation is completed, may determine waiting number and process information which notifies job order by reservation nears. In addition, the job reservation management unit 445, when reservation is completed in the mobile device 300 and reservation information is received, may manage this as user reservation job list, and manage detailed options. At this time, information regarding the list can be stored in a separate storage 430.

The storage 430 stores data and/or information processed by the image scanning apparatus 400 and provides when requested. In addition, the storage 430 may temporarily store information regarding a list generated by the offline job reservation execution unit 440.

FIG. 19 is a view illustrating a reservation process of offline job according to an exemplary embodiment, FIG. 20 is a view to describe a reservation process, and FIG. 21 is a view to describe a user notice.

Referring to FIG. 19, the mobile device 300 according to the exemplary embodiment executes the reserved application (S1910). Through this, a reservation job can be resumed.

As such, according to execution of an application, the mobile device 300 notifies that there is a request for reservation of offline job to the image scanning apparatus 400 (S1920). Between the mobile device 300 and the image scanning apparatus 400, communication operation is performed.

The above step of S1920 corresponds to a case where a user already selected a specific image scanning apparatus 400. If the specific device for communication is not set, the mobile device 300 may search for a nearby image scanning apparatus 400, select a desired image scanning apparatus 400 through search result and perform a reservation operation.

The image scanning apparatus 400, according to a request from the mobile device 300, monitors a job execution state first (S1930, S1940). This has been sufficiently described and will not be further described.

The mobile device 300 performs a reservation process based on monitoring state information received (S1950). In other words, various information as FIG. 20(*a*) can be reserved and options can be set through the mobile device 300] as a mobile device such as a Smartphone of FIG. 23. If an MFP as a specific image scanning apparatus 400 is not searched, a user may directly move to a MFP as illustrated in FIG. 20(*b*), register the MFP using the NFC tag, and perform a reservation process as FIG. 20(*a*).

At S1950, if a reservation process is completed, the mobile device 300 may transmit reservation information to the image scanning apparatus 400, and receive reservation state information notifying that reservation is received from the image scanning apparatus 400 (S1960). Here, the reservation information may include option information regarding resolution, and reservation state information can be made as a standby number as illustrated in FIG. 21(*a*).

In addition, the image scanning apparatus 400, when a job order regarding a reservation of a user nears, notifies it to the mobile device 300 (S1970). For example, as illustrated in FIG. 21(*b*), the mobile device 300 may notify by vibration or sound.

After notifying that the job order nears, the image scanning apparatus 400, until a user of the corresponding job order approaches, may set lock regarding an area relating to a specific function regarding reservation on a UI screen. Regarding the above, it is illustrated in FIG. 21(*b*).

As examples of a mobile device such as a Smartphone and MFP as an image scanning apparatus, a user executes an application having a mobile reservation notification function. When the mobile device and the MFP are in the same network, or network connection was established in the past, a user searches and selects an MFP to use through a mobile application. When selection is done, current MFP state, that is, type of job, progress of job, reservation of other uses are displayed on a mobile application so that a user can easily find out MFP state. When the MFP is being used, a user selects a type of a job and selects a detailed option. For example, in case of scan job, resolution, document storage method, type of a document to be scanned can be set as options. Then, a user reserves on the current MFP (see FIG. 20(*a*)). When a user reservation is done through a mobile application, along with the already set option, reservation information is transmitted to the MFP, and MFP issues a reservation number on a mobile application (see FIG. 21(*a*)).

If a user mobile device and the MFP to be used are not present in the same network, a user approaches the MFP for initial first time and performs network setting, search, and setting jobs. In this case, for easier setting, short distance networking such as Wifi-direct connection through NFC, BLE can be used (see FIG. 20(*b*)). If the network is set and MFP is searched, job selection, option setting, and user reservation are performed in the same manner as above, and the information is transmitted to MFP (see FIG. 20(*a*)).

When reservation is done and MFP completes jobs of another user, a series of operations are performed to assign priority to a reserved user. As described above, when a user reserves a scan job, a portion relating to scan, ADF (Automatic Document Feeder), UI are set as lock, and displayed through MFP UI. In this case, a message can be as shown below.

"Copy & Scan functions are locked for reservation in 30 sec."

That is, priority is assigned for predetermined time to a reserved user, UI is set as a locking screen to avoid approach of another user. At the same time, through a mobile application of a reserved user, reserved function's availability is noticed to a A user who receives reservation notice holds the mobile device, moves to the MFP to use, authenticates a device through NFC tagging, BLE connection, unlocks MFP lock screen and performs a job.

If, within the designated 30 seconds, the reserved user does not unlock locking of MFP, the locking screen is automatically released and priority is passed to another user, or if all the reservation ends, another user can freely use it (see FIG. 21(*b*)).

FIG. 22 is a flow chart illustrating a job reservation method to form an image offline according to an exemplary embodiment.

For convenient description, when referring to FIG. 22 along with FIG. 12, the mobile device 300 according to an exemplary embodiment receives a user command to reserve an offline job in the image scanning apparatus 400 (S2210). As such, a reservation related application can be executed according to a user command.

When a user command is received, the mobile device 300 may receive monitoring state information regarding the current job form the image scanning apparatus 400 and display it on a screen (S2220).

Then, the mobile device 300, based on received monitoring state information, may transmit reservation information to the image scanning apparatus 400, and when a reservation is received, the mobile device 300 may receive reservation state information transmitted from the image scanning apparatus 400 and display the information on a screen (S2230).

Then, the mobile device 300, if a job order regarding reservation nears, may receive notification from the image scanning apparatus 400 (S2240). In this case, notification can be expressed as vibration or sound in the image scanning apparatus 400.

Therefore, a method for reservation job execution to form an image offline in the mobile device enables notifying a user a state of MFP, presetting detailed option, reserving MFP use, and notifying and thus, a user does not need to wait unnecessarily or does not do any unnecessary operation. The method for reservation job to form an image offline as illustrated in FIG. 22 may be executed on a mobile device (or a terminal device) having a configuration of FIG. 15 or FIG. 16, and can be executed on a mobile device having another configuration.

In addition, the method for reservation execution to form an image offline in the mobile device can be implemented as a program including algorithm executable in a computer, and the above program can be stored in a non-transitory computer readable medium and provided.

FIG. 23 is a flow chart illustrating a method for performing reservation job to form an image offline according to an exemplary embodiment.

For easy explanation, when referring to FIG. 23 with FIG. 12, the image scanning apparatus 400 according to an exemplary embodiment monitors a job performing state upon request of the mobile device 300 (S2310).

The image scanning apparatus 400 generates state information by monitoring and sends it to the mobile device 300 (S2320). At this time, the state information by monitoring can include information regarding stand-by people regarding specific operations such as scanning and copying.

Furthermore, the image scanning apparatus 400, based on monitoring state information, receives reservation information reserved by a user in the mobile device 300, and when reservation is received, transmits reservation state information to the mobile device 300 (S2330). For example, as reservation state information, what is the standby number can be transmitted. Herein, if reservation information is information reflecting reservation, reservation state information means at which state the reservation 15.

The image scanning apparatus 400, when job order of users nears, notifies to the mobile device 300 of a user that job order nears (S2340).

During this process, the image scanning apparatus 400, as described above, may perform locking of a UI screen before a user with priority approaches the image scanning apparatus 400. If after predetermined time passed, there is no operation to unlock locking, it will be considered that the user waives offline job, locking will be automatically unlocked, and a job can be opened to a next reserving person or another user.

Therefore, a method for executing a reservation job offline to form an image in the image scanning apparatus, by notifying a user of status of MFP, enabling a user to pre-set detailed option of a job, and enabling a MFP reservation and notification, may reduce unnecessary waiting time or unnecessary operation. The method for performing a reservation job to form an image offline as FIG. 23 can be executed on the image scanning apparatus having the configuration of FIG. 17 and can be executed on the image scanning apparatus having another configuration.

In addition, a method for executing a reservation job offline can be implemented as a program including algorithm executable in a computer, and the above program can be stored in a non-transitory computer readable medium and provided.

The foregoing exemplary embodiments and advantages are merely exemplary and are not to be construed as limiting the present invention. The present teaching can be readily applied to other types of apparatuses. Also, the description of one or more exemplary embodiments is intended to be illustrative, and not to limit the scope of the claims, and many alternatives, modifications, and variations will be apparent to those skilled in the art.

What is claimed is:

1. An image scanning apparatus comprising:
    a scanner to generate a scan image by scanning a plurality of documents; and
    at least one processor to:
        in response to sensing the presence of a preset identification mark on a document while generating the scan image, process, as a first job, the scan image scanned before the document in which an identification mark is present and process, as a second job, the scan image including the document in which an identification mark is present and the scan image scanned after the document, and
        when the document in which the identification mark is present includes only identification mark information, process the scan image after the document including the identification mark to exclude a scan image corresponding to the document including only the identification mark information from the second job.

2. The image scanning apparatus of claim 1, wherein the at least one processor senses whether the preset identification mark is present in a preset area of the scan image.

3. The image scanning apparatus of claim 1, further comprising:

an interface to receive a separate second job command during the first job.

4. The image scanning apparatus of claim 3, wherein the at least one processor senses, after the second job command is input, whether the preset identification mark is present on the generated scan image.

5. The image scanning apparatus of claim 3, wherein the interface receives at least one of a scan option, storage information, or identification mark information which correspond to the second job command.

6. The image scanning apparatus of claim 3, wherein the interface comprises a communication interface to receive the second job command through a mobile device connectible with the image scanning apparatus.

7. The image scanning apparatus of claim 6, wherein the communication interface, when the second job is completed, notifies the mobile device, to which the second job command is transmitted, of job completion.

8. The image scanning apparatus of claim 3, further comprising:
an imager to print a printout which includes an identification mark corresponding to the second job.

9. The image scanning apparatus of claim 1, wherein the at least one processor, when the document in which the identification mark is present includes contents other than the identification mark information, performs image processing such that the identification mark is deleted from the scan image corresponding to the document in which the identification mark is present and processes the scan image subjected to the image processing and the scan image after the document in which the identification mark is present as the second job.

10. The image scanning apparatus of claim 1, wherein the identification mark comprises one of a preset pin number, a barcode, a quick response (QR) code, or a preset shape.

11. The image scanning apparatus of claim 1, wherein each of the first job and the second job comprises one of a scan job, a copy job, or a fax transmission job.

12. An image scanning method of an image scanning apparatus, the method comprising:
generating, by a scanner, a scan image by scanning a plurality of documents;
in response to sensing, by at least one processor of the image scanning apparatus, a preset identification mark on a document while generating the scan image, processing, by the at least one processor, as a first job, the scan image scanned before the document where the identification mark is present and processing, as a second job, the scan image including the document where the identification mark is present and the scan image scanned after the document; and
when the document where the identification mark is present includes only identification mark information, processing the scan image after the document including the identification mark to exclude a scan image corresponding to the document including only the identification mark information from the second job.

13. The image scanning method of claim 12, wherein the sensing comprises sensing whether a preset identification mark is present in a preset area of the scan image.

14. The image scanning method of claim 12, further comprising receiving a separate second job command during the first job.

15. The image scanning method of claim 14, further comprising sensing, after the second job command is input, whether the preset identification mark is present on the generated scan image.

16. The image scanning method of claim 14, further comprising receiving at least one of a scan option, storage information, or identification mark information which correspond to the second job command.

17. The image scanning method of claim 14, further comprising receiving the second job command through a mobile device connectible with the image scanning apparatus.

18. The image scanning method of claim 17, further comprising notifying the mobile device, to which the second job command is transmitted, of job completion.

19. The image scanning method of claim 12, further comprising, when the document where the identification mark is present includes contents other than the identification mark information, performing image processing such that the identification mark is deleted from the scan image corresponding to the document in which the identification mark is present and processing the scan image subjected to the image processing and the scan image after the document in which the identification mark is present as the second job.

20. A non-transitory machine-readable storage medium encoded with instructions executable by a processor of an image scanning apparatus, the machine-readable storage medium comprising:
instructions to generate a scan image by scanning a plurality of documents;
instructions to, in response to sensing the presence of a preset identification mark on a document while generating the scan image, process, as a first job, the scan image scanned before the document in which an identification mark is present and process, as a second job, the scan image including the document in which an identification mark is present and the scan image scanned after the document; and
instructions to, when the document in which the identification mark is present includes only identification mark information, process the scan image after the document including the identification mark to exclude a scan image corresponding to the document including only the identification mark information from the second job.

* * * * *